United States Patent
Reid et al.

(10) Patent No.: US 11,409,868 B2
(45) Date of Patent: Aug. 9, 2022

(54) RANSOMWARE DETECTION AND MITIGATION

(71) Applicant: AT&T Intellectual Property I, L.P., Atlanta, GA (US)

(72) Inventors: Dylan Reid, Atlanta, GA (US); Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 18 days.

(21) Appl. No.: 16/584,284

(22) Filed: Sep. 26, 2019

(65) Prior Publication Data
US 2021/0097181 A1    Apr. 1, 2021

(51) Int. Cl.
*G06F 21/56*    (2013.01)
*G06F 21/55*    (2013.01)
*G06F 21/64*    (2013.01)

(52) U.S. Cl.
CPC .......... *G06F 21/565* (2013.01); *G06F 21/554* (2013.01); *G06F 21/568* (2013.01); *G06F 21/64* (2013.01); *G06F 2221/034* (2013.01)

(58) Field of Classification Search
CPC ........... G06F 2221/033; G06F 2221/34; G06F 21/565; G06F 21/566; G06F 21/568; G06F 21/64
See application file for complete search history.

(56) References Cited

U.S. PATENT DOCUMENTS

| | | | | |
|---|---|---|---|---|
| 8,397,298 B2* | 3/2013 | Macwan | ................. | H04L 67/06 726/24 |
| 9,396,334 B1* | 7/2016 | Ivanov | ................... | G06F 16/188 |
| 9,734,337 B1* | 8/2017 | Patton | ................... | G06F 21/568 |
| 10,007,795 B1* | 6/2018 | Chung | ................... | G06F 21/568 |
| 10,121,003 B1* | 11/2018 | Adams | ................... | G06F 21/565 |
| 10,893,068 B1* | 1/2021 | Khalid | ................. | H04L 63/145 |
| 11,200,314 B2* | 12/2021 | Ellam | ................... | G06F 21/568 |
| 2009/0180777 A1* | 7/2009 | Bernard | ................ | H04L 41/509 398/68 |
| 2013/0262420 A1* | 10/2013 | Edelstein | .............. | G06F 40/197 707/695 |

(Continued)

OTHER PUBLICATIONS

"File hashing, checksum software, verify CRC MD5 SHA values," (Feb. 14, 2015). Retrieved from https://www.peazip.org/verify-checksum-hash.html.

(Continued)

*Primary Examiner* — Richard A McCoy
(74) *Attorney, Agent, or Firm* — Guntin & Gust, PLC; Kenneth Kwan (57) ABSTRACT

A processing system including at least one processor may detect an accessing of a file, where the accessing comprises a read operation, generate a copy of the file in response to detecting the accessing of the file, and store the copy of the file in a designated storage location. The processing system may further detect a completion of the accessing of the file, apply a checksum operation to the file to generate a checksum in response to detecting the completion of the accessing of the file, determine that the checksum does not match an expected checksum for the file, and generate an alert of a possible manipulation of the file in response to determining that the checksum does not match the expected checksum.

20 Claims, 3 Drawing Sheets

(56) References Cited

U.S. PATENT DOCUMENTS

| | | | |
|---|---|---|---|
| 2015/0205979 A1* | 7/2015 | Dong | G06F 21/565 |
| | | | 726/22 |
| 2017/0364681 A1* | 12/2017 | Roguine | G06F 21/554 |
| 2018/0124078 A1* | 5/2018 | Hajmasan | G06F 21/56 |
| 2018/0351969 A1* | 12/2018 | MacLeod | G06F 11/2038 |
| 2019/0087572 A1* | 3/2019 | Ellam | G06F 21/554 |
| 2019/0102549 A1* | 4/2019 | Krylov | G06F 21/564 |
| 2019/0108341 A1* | 4/2019 | Bedhapudi | G06F 16/1752 |
| 2019/0121976 A1* | 4/2019 | Pavlyushchik | G06F 21/568 |
| 2019/0121978 A1* | 4/2019 | Kraemer | G06F 21/566 |
| 2019/0188380 A1* | 6/2019 | Animireddygari | |
| | | | G06F 11/1464 |
| 2019/0266327 A1* | 8/2019 | Satpathy | G06F 21/6218 |
| 2019/0347415 A1* | 11/2019 | Yavo | G06F 21/566 |
| 2020/0082074 A1* | 3/2020 | McGregor | G06F 21/6209 |
| 2020/0250307 A1* | 8/2020 | Pendyala | G06F 16/1748 |
| 2020/0356686 A1* | 11/2020 | Vijayvargiya | G06F 21/568 |
| 2021/0004458 A1* | 1/2021 | Edwards | G06F 21/554 |

OTHER PUBLICATIONS

Sivathanu et al., "Enhancing File System Integrity Through Checksums," (May 8, 2004). Retrieved from https://www.filesystems.org/docs/nc-checksum-tr/nc-checksum.html.

Kharraz, et al., "UNVEIL: A Large-Scale, Automated Approach to Detecting Ransomware," Proceedings of the 25th USENIX Conference on Security Symposium, Aug. 2016, pp. 757-772.

* cited by examiner

RANSOMWARE DETECTION AND MITIGATION

The present disclosure relates generally to addressing ransomware attacks, and more particularly to methods, computer-readable media, and apparatuses for generating an alert of a possible manipulation of a file in response to determining that a checksum does not match an expected checksum.

BACKGROUND

Ransomware is malicious code that is delivered to computing devices and that encrypts one or more files with a key, or keys, held by an attacker. In many cases, an attacker may demand ransom money to decrypt the files. However, it is common for attackers to not decrypt the files even after receiving the ransom. Ransomware may come in three main varieties: replacers, generic ransomware, and full disk encryptors.

SUMMARY

In one example, the present disclosure describes a method, computer-readable medium, and apparatus for generating an alert of a possible manipulation of a file in response to determining that a checksum does not match an expected checksum. For example, a processing system including at least one processor may detect an accessing of a file, where the accessing comprises a read operation, generate a copy of the file in response to detecting the accessing of the file, and store the copy of the file in a designated storage location. The processing system may further detect a completion of the accessing of the file, apply a checksum operation to the file to generate a checksum in response to detecting the completion of the accessing of the file, determine that the checksum does not match an expected checksum for the file, and generate an alert of a possible manipulation of the file in response to determining that the checksum does not match the expected checksum.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Ransomware is malicious code that is delivered to computing devices and that encrypts one or more files with a key, or keys, held by an attacker. In many cases, an attacker may demand ransom money to decrypt the files. However, it is common for attackers to not decrypt the files even after receiving the ransom. Ransomware may come in three main varieties: replacers, generic ransomware, and full disk encryptors.

Replacers generally operate by writing to memory while encrypting. The ransomware replaces existing content with the corresponding encrypted content in the same file. This type of ransomware limits the entire process to reading and writing to a file. Replacers do not perform file delete or file create/rename operations. The ransom notes are placed within the compromised files, appended to the encrypted content. The files attacked by such ransomware have the extension types preserved. When analyzing the contents of a compromised folder, the appearance is the same as a healthy folder. Only the file contents are encrypted. Without tools to prevent or address ransomware encryption, a user of the computing device may only realize that there has been an attack when opening a corrupt file. It may therefore take a significant time to detect such an attack and, consequently, more files may be lost.

Generic ransomware uses the most widespread and widely available encryption techniques. This type of ransomware creates new files containing the encrypted content and deletes (or safe-deletes) the original files. For instance, content may be transferred to memory, encrypted and placed in a new file, while the original file is removed. Generic ransomware performs more file operations and less in-memory operations as compared to replacer-type ransomware. The basic encryption process for generic ransomware may include: reading file contents, encrypting the content in the memory, creating a new file, writing the encrypted content to the new file, (optionally) appending a "signature" extension to the new file to show that it has been compromised, continuing until the entire original file is encrypted, deleting the original file, and (optionally) removing shadow copies or performing zero-write operations on the associated sectors of the hard drive, to prevent the recovery of the original file.

Ransomware that encrypts entire disk volumes (full disk encryptors) first boots up its own code instead of the host operating system (OS) of the computing device that is attacked, then applies a full volume encryption to one or more disk partitions. Such ransomware may be difficult or impossible to detect during the encryption process because, at that point, the host OS does not run, nor do any security applications which run via the host OS. Hence, such ransomware generally should be stopped before the ransomware boot code is loaded. The encryption process for a full disk encryptor may include: modifying the master boot record to load the ransomware code at the next reboot, (optionally) causing a critical "stop" error in the computing device to trigger a reboot, loading ransomware boot code upon reboot (instead of the host OS), applying full volume encryption to one or more disk partitions, and presenting a ransom demand via the computing device, e.g., a ransom note presented on a display of the computing device with instructions on how to pay. The host OS does not load again until the ransomware is removed. However, oftentimes such ransomware does not successfully carry out the recovery process.

Examples of the present disclosure provide for methods, computer-readable media, and devices for generating an alert of a possible manipulation of a file in response to determining that a checksum does not match an expected checksum. Examples of the present disclosure provide a last line of defense when general antivirus applications fail to detect ransomware. In one example, the present disclosure may target high-value environments since it may utilize significant memory resources during normal operation.

Examples of the present disclosure are applicable to individual computing devices and distributed computing systems comprised of multiple hardware devices and components, such as cloud-based computing systems. As referred to herein a computing system may refer to a single protected device or a distributed system that includes multiple computing devices, or components of multiple computing devices (such as a plurality of VMs operating on a plurality of host devices, where the plurality of VMs collectively provide a computing system that is configured to provide one or more services).

In one example, the present disclosure may provide an application (which may be referred to herein as a "ransomware protection application") that is installable on the operating system of computing devices or systems (servers, laptops, clustered servers, virtual machines (VMs), cloud platforms, smart phones, Internet of Things (IoT) devices, tablet computing devices, and so forth) and which may be referred to as RBDP (Ransomware Behavioral-based Detection and Protection). In one example, the ransomware protection application (or at least a component thereof) may be installed in and operate at the kernel level and may interface between running processes of the computing system (e.g., including those possibly comprising a running ransomware application) and file system input/output (I/O) drivers to provide a view of all file read operations of the protected computing system. In another example, the present disclosure may provide a ransomware protection application that functions as an independent operating system (e.g., a skinny OS with only few libraries that can interface with hardware elements (e.g., processor(s), memory, storage, network interface card(s) (NIC(s)), etc.) that will be active upon rebooting a protected computing system to ensure that the computing system is not rebooted and locked by whole-disk encryptor-type ransomware.

In one example, a ransomware protection application of the present disclosure may enable a user to configure a "temporary safe place" (TSP); a temporary storage location, which may comprise an external storage device or system (e.g., a universal serial bus (USB) storage device, an external hard drive, network and/or cloud-based storage, and so forth), or internal storage (e.g., a protected segment on one or more internal hard drives). In accordance with the present disclosure, the TSP may be allocated to and accessible only by the ransomware protection application. In one example, a TSP may be a virtual network function (VNF), and can be managed by a cloud application programming interface (API).

In one example, each time a protected file is read (e.g., to a memory or to another file), the present ransomware protection application may generate another copy of the file, and automatically send the file to the TSP until the operation on the read file is complete. The ransomware protection application may then verify the read content of the original file. For instance, the verification may comprise applying a checksum operation to the read file and applying the same checksum operation to the copy of the file stored in the TSP. If the checksums are identical, this is indicative that no issues are detected and the content in the TSP may be released (e.g., erased). If the checksums are different, this could mean that the original file is changed (possible encrypted by ransomware or modified by a user and/or another application for legitimate purposes).

In such case, an alert may be generated and presented via the computing system and/or sent to one or more other devices, computing systems, or responsible users (e.g., a text message, email, audible alert, screen popup, etc.). The type(s) of alert(s), the devices, computing systems, and/or users to be alerted, and so forth may be configured by an administrator of the computing system to be protected. The present ransomware protection application may also present one or more response options to one or more of such entities receiving an alert. For instance, response options may include: (a) deleting the file and restoring the copy of the file from the designated storage location (i.e., the TSP), (b) restoring the copy of the file from the designated storage location, renaming the file, and storing the file that is renamed in a different storage location, (c) deleting the copy of the file, and so forth.

In one example, upon detecting a possible manipulation of the file in response to detecting a mismatch between the checksums, the ransomware protection application may perform further operations to distinguish between file encryption (e.g., indicative of ransomware) and other file modifications (which may be the result of legitimate applications and/or user activities, or the result of a compromised or malfunctioning application or another type of malware exceeding permissions to modify the file in an unauthorized manner (e.g., other than ransomware-based encryption). For instance, encryption or other types of modifications will both result in failure of the checksum. However, a bit-by-bit (or byte-by-byte) comparison of the file that is accessed and the copy thereof will reveal near zero commonality if the file is encrypted by ransomware, whereas another type of modification may still result in significant overlap and similarity. Thus, the ransomware protection application may apply bit-level or byte-level comparison, or the like, as a second stage filter to distinguish among ransomware-based modifications (e.g., unauthorized encryption), and other types of modifications (which may be authorized or unauthorized depending upon the user and/or the process that is accessing the file, the actual modification that is applied to the file, etc.).

In one example, the ransomware protection application may perform a local search for a matching file for the stored content (in case the file is moved into different folder by the user or other application). In addition, in one example, the ransomware protection application may monitor the computing system for outgoing encrypted messages. For instance, ransomware may attempt to notify a control server or ransomer that an encryption of one or more files is completed. In one example, the ransomware protection application may include a machine learning (ML) module that may periodically query one or more repositories that are accessible via one or more networks and/or the Internet in general for new ransomware packages and/or signatures of such ransomware packages to detect the presence and/or installation on a monitored computing system. For instance, the ransomware or signatures thereof may include actual code, code samples or code snippets, filenames and extensions, file sizes, characteristics of the ransomware behavior, such as the general category of ransomware (e.g., one of the three overall categories described above), the numbers and types of files targeted for encryption, the time period after encryption when a ransomware message may be presented, the remote control servers, or other devices or domains that are communicated with, and so forth. In one example, the present ransomware protection application may monitor the process originating the outgoing message and may include the identification of the process as part of the alert information.

In one example, the present disclosure may relate to files having read-only permissions. However, the present disclosure may also relate to files having other permission levels, files which are subject to one or more access control lists (ACLs), and so forth. For instance, some ransomware packages may have the ability to obtain administrator privileges and/or may have the ability to change permission levels or to override permission levels with regard to various files. In addition, even if a file is not designated as read-only and is intended to be modified by one or more users or other accessing applications, other devices or computing systems, and so forth, it may still be desirable to protect the file from unauthorized modification (e.g., encryption by a ransomware process) using the ransomware protection application and techniques of the present disclosure.

In one example, the present ransomware protection application copies entire files and applies checksums to the entire contents thereof (as well as to the file copies). However, in another example, if the read operations only access a portion of a file, the portion of the file may be copied and the verification via checksum operations may be applied to the accessed portion of the original file and a copied portion of the file that is stored in the TSP.

In one example, the ransomware protection application of the present disclosure may whitelist safe trusted processes/programs which may utilize encryption such that the application does not apply the above process when a file read is initiated by a whitelisted process. This may conserve substantial computing system resources insofar as the copying of files to the TSP, the checksum operations, and so forth, may consume significant memory and other resources (e.g., CPU utilization, network utilization (if the TSP is external to the computing device), etc.).

In one example, the present ransomware protection application may include a user interface component to present options to a user for configuring a TSP, for whitelisting other programs, applications, and/or the processes thereof, for selecting files to be protected, for selecting drives and/or partitions to be protected, for configuring alert conditions for notifying of detected file modifications, for selecting devices and/or users to be alerted, for presenting remediation options to address a file modification alert, and so on. These and other aspects of the present disclosure are described in greater detail below in connection with the examples of FIGS. 1-3.

Figure 1:
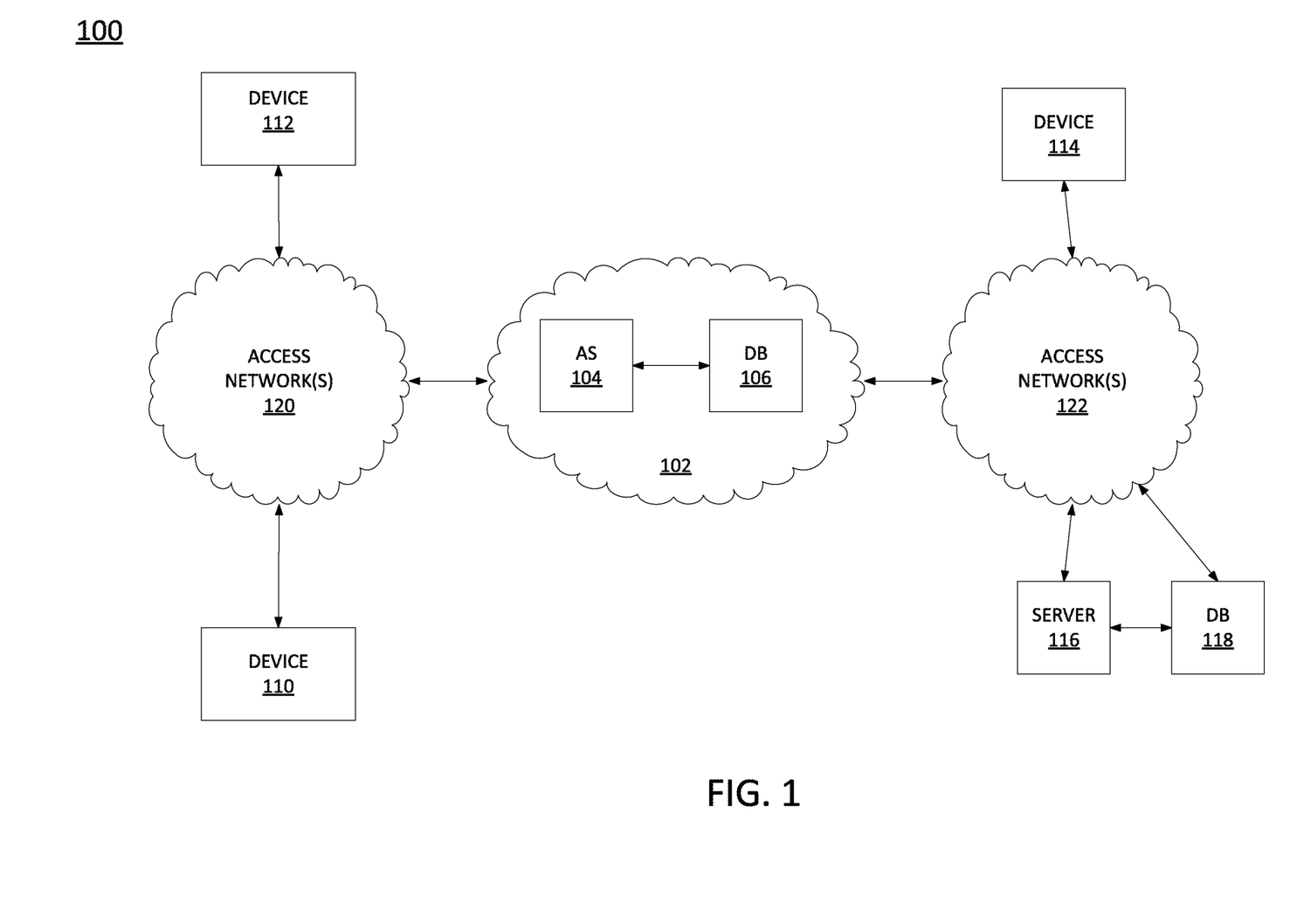
FIG. 1 illustrates an example network related to the present disclosure.

To further aid in understanding the present disclosure, FIG. 1 illustrates an example system 100 in which examples of the present disclosure for generating an alert of a possible manipulation of a file in response to determining that a checksum does not match an expected checksum. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110 and 112. Similarly, access networks 122 may be in communication with one or more devices, e.g., device 114. The access networks 122 may also be in communication with a server 116 and a database (DB) 118. Access networks 120 and 122 may transmit and receive communications between devices 110, 112, and 114, between devices 110, 112, and 114, and server 116 and/or database (DB) 118, application server (AS) 104 and/or database (DB) 106, other components of network 102, devices reachable via the Internet in general, and so forth. In one example, each of the devices 110, 112, and 114 may comprise any single device or combination of devices that may comprise an endpoint device. For example, the devices 110, 112, and 114 may each comprise a mobile device, a cellular smart phone, a laptop, a tablet computer, a desktop computer, an application server, a bank or cluster of such devices, an IoT device, and the like.

In one example, any one or more of devices 110, 112, and 114 may each comprise programs, logic or instructions for generating an alert of a possible manipulation of a file in response to determining that a checksum does not match an expected checksum as described herein. For example, devices 110, 112, and/or 114 may each comprise a computing system or device, such as computing system 300 depicted in FIG. 3, and may be configured to provide one or more operations or functions for generating an alert of a possible manipulation of a file in response to determining that a checksum does not match an expected checksum. Similarly, server 116 may comprise a computing system or server, such as computing system 300 depicted in FIG. 3, and may be configured to provide one or more operations or functions for generating an alert of a possible manipulation of a file in response to determining that a checksum does not match an expected checksum, as described herein. In one example, DB 118 may comprise a physical storage device integrated with server 116 (e.g., a database server), or attached or coupled to the server 116, to store various types of information. In one example, DB 118 may store various files that may be protected by a ransomware protection application of the present disclosure. Alternatively, or in addition, DB 118 may comprise a trusted safe place (TSP), e.g., a storage system comprising a designated storage location for storing copies of read files in accordance with the present disclosure.

Figure 3:
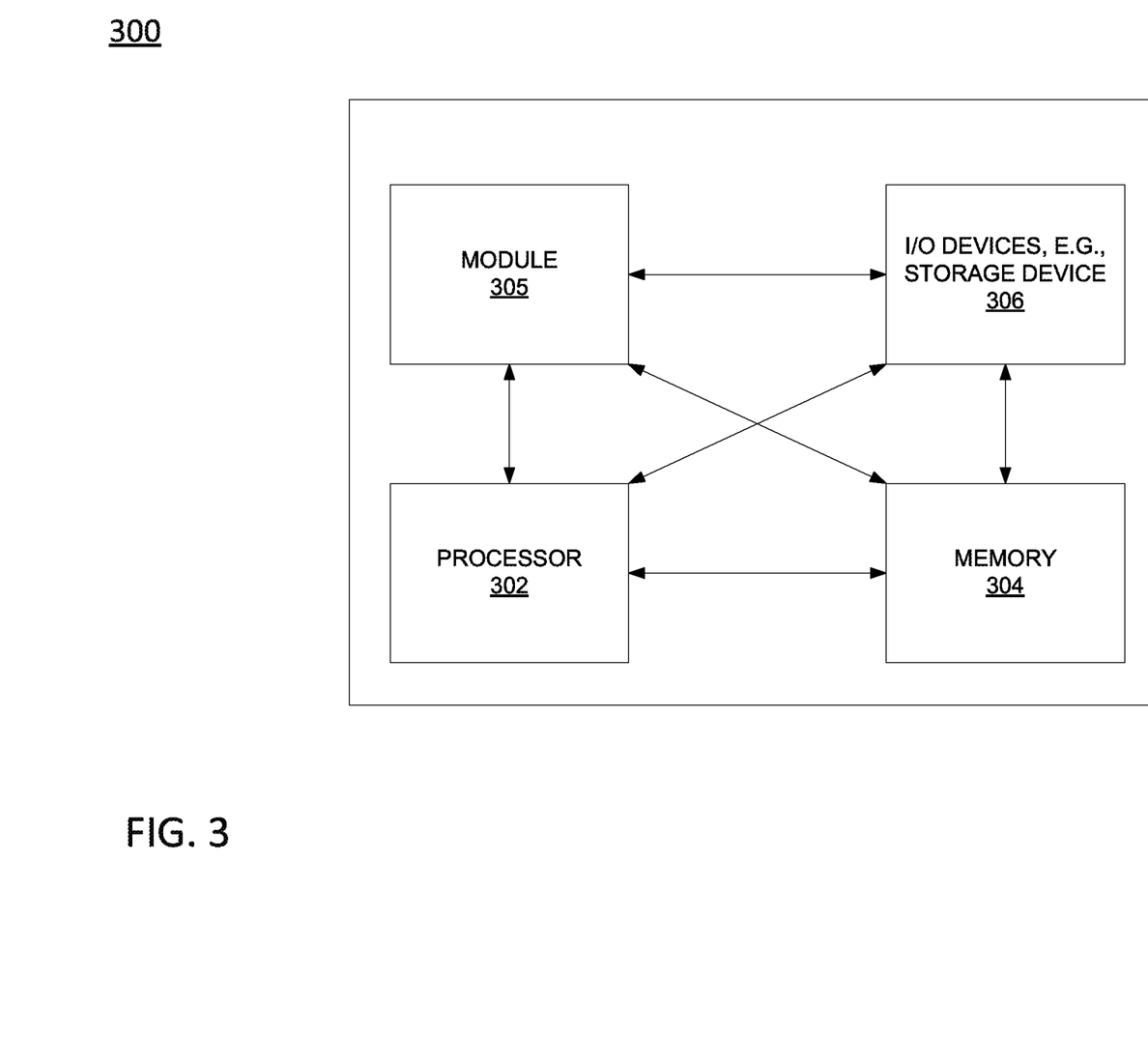
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

It should be noted that any one of devices 110, 112, or 114 may also comprise a device of a ransomware attacker (or ransomer) that is intent upon exploiting other specific devices or computing systems, and/or indiscriminately targeting any devices or other computing systems that may be vulnerable to exploit. To illustrate, server 116 may comprise an enterprise server of a large organization, e.g., a national bank, a hospital network, a university, a city government, etc. Accordingly, server 116 may comprise a high value target for a bad actor intent upon exploiting various files stored on server 116 for encryption and collection of a ransom. For instance, the bad actor may utilize device 112 to initiate an attack on server 116 over one or more networks and may gain access to server 116 to install and run a ransomware application (e.g., as one or more running processes). The attack may be via a malicious attachment to an email, a text message exploit, a poison link placed on a website that may be accessed by server 116 or that may be accessed by a computing device of a user having privileged access to server 116, a command or series of commands via a remote connection service, such as a command line interface capable of facilitating remote commands, a screen sharing service, a remote monitoring and control application, or the like.

A successful attack may result in the downloading of code, instructions, or the like for the installation of a ransomware application and the running of the ransomware application as one or more processes on server 116 (e.g., loaded in to memory and executed by one or more processors of server 116). In any case, the ransomware application may instantiate processes to engage in encryption operations such as described above. For example, the ransomware application may comprise a generic-type ransomware application that may: read file contents, encrypt the content in the memory, create a new file, write the encrypted content to the new file, (optionally) append a "signature" extension to the new file to show that it has been compromised, continue until the entire original file is encrypted, delete the original file, and (optionally) remove shadow copies or performing zero-write operations on the associated sectors of the hard drive. In another example, the ransomware application may also comprise a replacer-type ransomware and may perform corresponding operations as described above to encrypt one or more files of server 116.

However, server 116 may have installed and in operation thereon a ransomware protection application of the present disclosure. Accordingly, upon the ransomware application attempting to read a first file of server 116, the ransomware protection application may detect the read operation. For instance, the ransomware protection application may include a component that operates at the kernel level and that is able to view all file system input/output operations between running processes and the kernel file system hardware driver(s). The ransomware protection application may then make a copy of the file and store the copy in a TSP. For instance, the TSP may comprise DB 118 or at least a portion thereof (e.g., a particular disk, a disk sector, a partition, etc.). It should be noted that DB 118 may also comprise a plurality of storage devices which collectively provide a storage system. For instance, DB 118 may comprise a network-based and/or a cloud storage system which may logically appear as a unitary database, but which may be physically spread over one or more hardware devices.

In any event, the ransomware protection application may store the copy of the file in the TSP and may continue to monitor the file system input/output operations of server 116. Upon detecting the completion of accessing of the file, the ransomware protection application may then perform a checksum operation on the file that has been read (and possibly manipulated via a write operation, or the like) and the copy of the file in the TSP. In one example, the ransomware protection application may recall the copy of the file from the TSP. For instance, the TSP may be physically located on a different device and the copy of the file may be recalled to server 116. Similarly, if the TSP is physically located within a storage component of server 116, the ransomware protection application may recall the file to memory to perform checksum operations. It should be noted that identical checksum operations may be performed with respect to the file and the copy of the file. If the checksums match, the ransomware protection application may conclude that the file has only been read and not manipulated. However, if the checksums do not match, the ransomware protection application may determine that the file has been modified.

In one example, the ransomware protection application may generate an alert in response to determining that the checksums do not match (and that the file has therefore been modified). The alert may be presented audibly or visually via server 116. Alternatively, or in addition, the alert may be sent to one or more other devices, such as device 110, device 114, etc. For instance, devices 110 and 114 may be associated with system administrators responsible for server 116. In one example, the ransomware protection application may also apply bit-level or byte-level comparison, or the like, as a second stage filter to distinguish among ransomware-based modifications (e.g., unauthorized encryption), and other types of modifications. The determination of the second stage filter may also be included in the same alert or a different alert.

The type(s) of alert(s), the devices, computing systems, and/or users to be alerted, and so forth may be configured by an administrator of the server 116. For instance, the ransomware protection application of server 116 may include a user interface component (e.g., a user space process, or non-kernel space/non-administrator-privileged process) which may enable configuration of various selectable parameters, such as the type(s) of alert(s), the available response options, the files, disks, drives, and/or partitions to be protected, and so forth. In this regard, the ransomware protection application of server 116 may also present one or more response options to one or more of such entities receiving an alert. For instance, response options may include: (a) deleting the file and restoring the copy of the file from the designated storage location (i.e., the TSP), (b) restoring the copy of the file from the designated storage location, renaming the file, and storing the file that is renamed in a different storage location, or (c) deleting the copy of the file, and so forth. Thus, for example, the ransomware protection application of server 116 may receive a response from device 114 selecting to delete the file and restore the copy of the file from the designated storage location. The ransomware protection application of server 116 may then perform these operations in accordance with the instructions.

In one example, the ransomware protection application of server 116 may perform additional operations, such as performing a local search for a matching file for the stored content (in case the file is moved into different folder by the user or other application), monitoring a NIC of server 116 for outgoing encrypted messages, e.g., to device 112 and/or to one or more additional remote devices, which may be associated with a ransomer, searching the server 116 to detect ransomware packages and/or signatures of such ransomware packages, and so on.

In one example, the ransomware protection application of server 116 may include a machine learning (ML) module that may periodically query one or more repositories that are accessible via one or more networks of system 100 and/or the Internet in general for new ransomware packages and/or signatures of such ransomware packages. For instance, as illustrated in FIG. 1, network 102 may include an application server (AS) 104 and a database (DB) 106. In one example, AS 104 may provide a service to subscribers (e.g., in addition to other telecommunication services provided by network 102) in support of systems generating an alert of a possible manipulation of a file in response to determining that a checksum does not match an expected checksum, in accordance with the present disclosure. For instance, DB 106 may comprise a physical storage device integrated with server 104 (e.g., a database server), or attached or coupled to the server 104, to store various types of information in support of systems for generating an alert of a possible manipulation of a file in response to determining that a checksum does not match an expected checksum. For example, DB 106 may store executables and/or code signatures of known ransomware applications/processes. In addition, DB 106 may store usage patterns for detecting ransomware operations on a computing system.

In one example, the patterns may be specific to particular device types or other computing system types. The ransomware or signatures thereof may include actual code, code samples or code snippets, filenames and extensions, file sizes, characteristics of the ransomware behavior, such as the general category of ransomware (e.g., one of the three overall categories described above), the numbers and types of files targeted for encryption, the time period after encryption when a ransomware message may be presented, the remote control servers or other devices or domains that are communicated with, and so forth.

In one example, DB 106 may store access control lists (ACLs) for various protected files (e.g., of server 116 and/or DB 118, and for other protected computing systems, such as one of devices 110, 114, etc. For instance, a ransomware protection application installed and operating locally on a protected computing system (e.g., on device 110) may interact with AS 104 for each file read operation to determine whitelisted users and/or applications that may be permitted to access particular files, drives, sectors, etc. without applying the ransomware protection operations described herein (e.g., copying a read file to a TSP, performing checksum operations, etc.). In one example, DB 106 may also store a ransomware protection application (or various versions thereof for different operating systems, devices and/or computing system types, etc.), various updates therefor, and so on. For instance, devices 110, 114, server 116, and so forth may communicate with AS 104 to request ransomware protection applications that may be locally installed on the requesting computing system, to request updates to ransomware protection applications that are already locally installed, and so forth.

The foregoing describes just one example of how a ransomware protection application may operate with respect to a protected computing system (e.g., server 116). Thus, it should be noted that the same or similar operations may be provided with respect to various other protected devices and/or other computing systems that may have a ransomware protection application installed and in operation thereon, such as device 110, device 114, and so forth. In one example, AS 104, DB 106, and/or a computing system collectively comprised of AS 104 and DB 106 may also be a protected computing system having a ransomware protection application installed thereon. For instance, AS 104 may perform operations of the method 200 of FIG. 2 to detect and generate alerts for ransomware that may be attempting to exploit the files of AS 104 and/or DB 106. In other words, AS 104 and/or DB 106 may become compromised via ransomware, which may be detected and mitigated via the techniques described herein.

It should be noted that in one example, DB 118 may store similar information as described above with regard to DB 106, and server 116 may perform similar operations as described above with regard to AS 104. For instance, a third-party may provide services to subscribers in connection with systems for generating an alert of a possible manipulation of a file in response to determining that a checksum does not match an expected checksum, in accordance with the present disclosure.

Although only a single server 116 and a single DB 118 are illustrated, it should be noted that any number of servers 116 or databases 118 may be deployed. Similarly, although only a single AS 104 and a single DB 106 are illustrated, it should be noted that any number of application servers 104 or databases 106 may be deployed. In addition, in one example, server 116, DB 118, AS 104, and/or DB 106, or any one or more of such devices in conjunction with one or more other devices (e.g., devices 110 and/or 114), may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114 and server 116 may access network 102 via different access networks, devices 110 and 112 may access network 102 via different access networks, and so forth. Thus, these and other modifications are all contemplated within the scope of the present disclosure.

Figure 2:
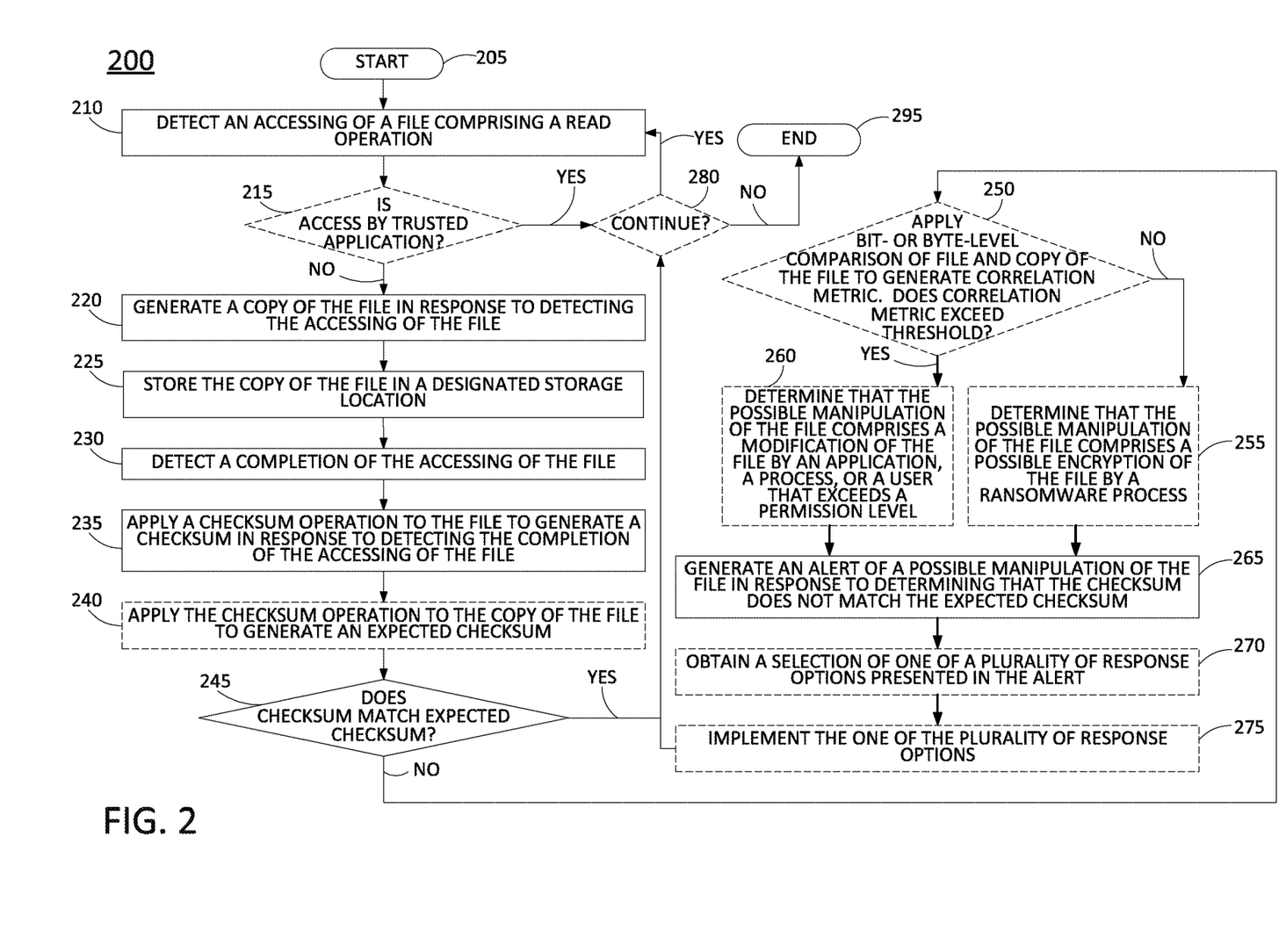
FIG. 2 illustrates a flowchart of an example method for generating an alert of a possible manipulation of a file in response to determining that a checksum does not match an expected checksum.

FIG. 2 illustrates a flowchart of an example method 200 for generating an alert of a possible manipulation of a file in response to determining that a checksum does not match an expected checksum, in accordance with the present disclosure. In one example, the method 200 is performed by a component of the system 100 of FIG. 1, such as by one of devices 110, 112, or 114, the server 116, or application server 104, and/or any one or more components thereof (e.g., a processor, or processors, performing operations stored in and loaded from a memory), by a plurality of the devices 110, 112, or 114, server 116, or application server 104, or by any one or more of such devices in conjunction with one or more other devices, such as DB 106, DB 118, and so forth. In one example, the steps, functions, or operations of method 200 may be performed by a computing device or system 300, and/or processor 302 as described in connection with FIG. 3 below. For instance, the computing device or system 300 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system detects an accessing of a file (e.g., of a protected computing system). The processing system may comprise all or a portion of a computing system as described herein, which may physically comprise one or more computing devices. For instance, the protected computing system may comprise a single computing device, a plurality of computing devices, a virtual machine (VM) that is hosted by one or more host computing devices, a distributed data storage system (e.g., a Hadoop distributed file system (DFS)) comprising a plurality of host storage devices, and so forth. The file may be a protected file and may comprise a word processing document, an Adobe Portable Document Format (PDF) document, a image file, a video file, an application binary file, a library file that is accessed by a plurality of applications of the protected computing system for various purposes, a hardware driver file, and so forth. In this regard, it should be noted that any file of any file type may be protected from ransomware encryption or other unauthorized file modifications in accordance with the present method 200.

In one example, the processing system may implement a ransomware protection application and may include a kernel level component that obtains file system I/O operations, e.g., prior to passing of commands to kernel file system I/O drivers. Thus, for example, the detecting of the accessing of a file may comprise detecting a file read command regarding the file, which may be initiated by an application (e.g., a process and/or a thread) thereof running on the protected computing system. For instance, a file read command may be initiated by a ransomware application to then apply unauthorized encryption to file, append a ransom note, and so forth.

At optional step 215, the processing system may detect whether the file access is initiated by a trusted application (or trusted user). For instance, the processing system may access a whitelist of trusted applications (or the process(es) thereof), trusted users, trusted remote devices, etc., which may be permitted to access files and for which additional ransomware protections are not to be performed. When it is determined that the access of the file is by a trusted entity, the method 200 may proceed to step 280 (and in one example, may then return to step 210 to continue monitoring for file accesses).

At step 220, the processing system generates a copy of the file in response to detecting the accessing of the file at step 210 (and in one example, further in response to determining that the file access is not by a trusted entity at optional step 215). In one example, if the file access comprises a read of less than all of the file, the copy of the file may comprise a copy of the portion of the file that is read (and may omit the remainder of the file). However, in another example, even if the access of the file does not read all of the file (e.g., to memory or another file), step 220 may still comprise making a copy of the entire file. In one example, the generating of the copy may be in accordance with the kernel level component implemented by the processing system.

At step 225, the processing system stores the copy of the file in a designated storage location (e.g., a "trusted safe place" (TSP)). In one example the designated storage location may be selected in advance by an administrator of the protected computing system. The designated storage location may comprise, for example, a data storage component of the protected computing system, e.g., one or more internal hard disk drives (HDDs) or solid state drives (SSDs), sectors or partitions thereof, etc., and/or at least a portion of a memory of the protected computing system. For instance, device memory may be selected as the designated storage location when the file is sufficiently small, the number of concurrent file accesses that are managed by the processing system in accordance with the method 200 is sufficiently small such that the protected computing system can continue operations of other processes), and so forth. Alternatively, or in addition, the designated storage location may comprise an external HDD, SDD, a universal serial bus (USB) drive, a combination thereof, and so forth. In addition, the designated storage location may alternatively or additionally comprise a distributed data storage system provided via a plurality of host data storage devices (such as a Hadoop distributed file system, or the like). In the case where the designated storage location (or at least a portion thereof) is external to the processing system, step 225 may include sending the copy of the file to the designated storage location via one or more external connections (e.g., a universal serial bus (USB) interface, a Peripheral Component Interchange express (PCIe) interface, or the like), and/or via one or more networks.

At step 230, the processing system detects a completion of the accessing of the file. For instance, the completion of the accessing of the file may comprise a file close operation, a file write operation, a file delete operation, or the like. It should again be noted that in one example, the processing system may access file system I/O operations before passing commands to the file system drivers (e.g., via a kernel level component) and may thus detect the completion of the accessing of the file.

At step 235, the processing system applies a checksum operation to the file to generate a checksum in response to detecting the completion of the accessing of the file. In one example, the checksum operation may be in accordance with a checksum algorithm, and may further be in accordance with one or more parameters, such as one or more checksum keys. In one example, the checksum operation is applied to a portion of the file (less than the entire file). For instance, the accessing of the file may comprise a read of only a portion of the file. Accordingly, in one example, the checksum operation may be limited to the portion of the file that is accessed.

At optional step 240, the processing system may apply the checksum operation to the copy of the file to generate an expected checksum. It should be noted that optional step 240 may apply the same checksum algorithm, the same key(s) and/or other parameters, and so forth as applied at step 235. If step 235 comprises applying the checksum operation to less than all of the file, then optional step 240 may correspondingly be applied to the same portion of the copy of the file.

In one example, the checksum algorithm may be selected by an administrator of the protected computing system. In one example, the checksum algorithm and/or the parameters thereof may change. For instance, the algorithm(s) and/or the parameters thereof may be changed periodically and/or in accordance with a different schedule. In this way, it may be more difficult for a ransomer to exploit the current ransomware protection process of the method 200 by possibly manipulating or tampering with the checksum process of step 235 (and optional step 240).

At step 245, the processing system may determine that the checksum does not match an expected checksum for the file. When it is determined that the checksum does not match the expected checksum, the method 200 may proceed to optional step 250 or to step 265. Otherwise, the method 200 may proceed to step 280 (and in one example, may then return to step 210 to continue monitoring for file accesses).

At optional step 250, the processing system may apply a bit-level or a byte-level comparison of the file and the copy of the file to generate a correlation metric between the file and the copy of the file, where optional step 250 is performed in response to determining that the checksum does not match the expected checksum at step 245. When the correlation metric is less than a threshold level of correlation, the method 200 may proceed to optional step 255 where the processing system may determine that the possible manipulation of the file comprises a possible encryption of the file by a ransomware process. When the correlation metric is greater than a threshold level of correlation, the method 200 may proceed to optional step 260 wherein the processing system may determine that the possible manipulation of the file comprises a modification of the file by an application that exceeds the permission level of the application. In one example, the bit-level or byte-level comparison can be applied to all or at least a portion of the file and the copy of the file. For instance, in one example, the comparison may be stopped if and when the threshold is reached. Following either of optional steps 255 or 260, the method 200 may proceed to step 265.

At step 265, the processing system generates an alert of a possible manipulation of the file in response to determining that the checksum does not match the expected checksum at step 250. For instance, the alert may indicate a possible encryption of the file by a ransomware process. In one example, the alert may indicate the possible encryption of the file by the ransomware process specifically in response to determining that the correlation metric is less than a threshold level of correlation at optional steps 250 and 255. In one example, the alert may indicate that the possible manipulation of the file comprises a modification of the file by another application, a process, or a user that exceeds the permission level of the application, the process, or the user. In one example, the alert may indicate the application and/or the process, or the user that initiated the file access.

The alert may be presented audibly, visually, or both, via the processing system. In one example, the alert may alternatively or additionally comprise an email message, a text message, or the like to one or more other devices (e.g., of a system administrator, a database owner, etc.). The recipient device(s) may alternatively or additionally use a dedicated monitoring application which may be caused to present the alert visually or audibly, via a tactile modality, and so forth depending upon the device capabilities, user preferences, etc. In one example, the alert presents a plurality of response options to address the possible manipulation of the file. For instance, the plurality of response options may comprise at least two of: (1) deleting the file and restoring the copy of the file from the designated storage location, (2) restoring the copy of the file from the designated storage location, renaming the file, and storing the file that is renamed in a different storage location, or (3) deleting the copy of the file.

At optional step 270, the processing system may obtain a selection of one of the plurality of response options. For instance, a system administrator, a database owner, or the like may enter the response option via one or more user interface components of the protected computing system, or may transmit a message to the processing system from a remote device with a selection of a response option.

At optional step 275, the processing system may implement the one of the plurality of response options, e.g.: (1) deleting the file and restoring the copy of the file from the designated storage location, (2) restoring the copy of the file from the designated storage location, renaming the file, and storing the file that is renamed in a different storage location, or (3) deleting the copy of the file. Following step 265, optional step 270, and/or optional step 275, the method 200 may proceed to step 280.

At step 280, the processing system may determine whether to continue. For instance, the method 200 may run on a continuous basis until a system administrator, a database owner, or the like disables a ransomware protection application of the processing system that enables the method 200, until the protected computing system is shut down and/or restarted, and so forth. When it is determined to continue, the method 200 may return to step 210. Otherwise, the method 200 may proceed to step 295.

At step 295 the method 200 ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200 by detecting an access of the same file or a different file, generating a copy, storing the copy in the designated storage location, detecting the completion of the accessing of the file, applying the checksum operation to generate a checksum, generating an alert, and so on. In one example, the generating the copy of the file in response to detecting the accessing of the file, the storing the copy of the file in designated storage location, the detecting the completion of the accessing of the file, and the applying the checksum operation to generate a checksum, and so forth of the method 200 may comprise a verification process to detect a possible manipulation of the file. In one example, an additional iteration of the method 200 may involve detecting an additional accessing of the file by a trusted application, a trusted process, or a trusted user (e.g., at optional step 215). In such case, the processing system may omit performance of the verification process for the additional accessing of the file by the trusted application, the trusted process, or the trusted user. In one example, the method 200 may also include first obtaining a whitelist of trusted applications/ programs, processes, and/or users for which the extra protections of the method 200 are not applicable.

In one example, optional step 240 could alternatively be performed before step 235. In another example, optional step 240 may alternatively be performed before step 230. In one example, the method 200 may be expanded to include obtaining various configuration parameters of a ransomware protection application that enables the method 200, such as the protected files, disks, drives, sectors, etc., the available response options, the type(s) of alert(s), the recipients of the alert(s) (e.g., when the alert(s) include messaging to external entities), information regarding the location of and how to access the TSP, and so forth. In one example, the method 200 may further include obtaining checksum key(s), checksum algorithm(s) to be applied, etc. Additional iterations of the method 200 may include obtaining new checksum key(s), new checksum algorithm(s), etc. (e.g., from a server providing a service in support of operations for generating an alert of a possible manipulation of a file in response to determining that a checksum does not match an expected checksum, as described herein). Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for generating an alert of a possible manipulation of a file in response to determining that a checksum does not match an expected checksum, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for generating an alert of a possible manipulation of a file in response to determining that a checksum does not match an expected checksum (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating an alert of a possible manipulation of a file in response to determining that a checksum does not match an expected checksum (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
presenting, by a processing system including at least one processor and implementing a protection application, a user interface that enables a user selection of files, drives, and drive partitions to be protected by the protection application and enables user selection of trusted users permitted to modify protected files;
receiving, by the processing system and via the user interface, a first user designation of a plurality of files and at least one drive or drive partition to be protected by the protection application and a second user designation of a plurality of trusted users;
detecting, by the processing system, a read operation of a file during an initial accessing of the file;
responsive to the detecting the read operation of the file, determining, by the processing system, whether there is an indication of a ransomware attack by identifying whether the file is included in the plurality of files to be protected by the protection application and whether the initial accessing of the file is performed by any of the plurality of trusted users;
generating, by the processing system, a reference copy of the file in response to a determination that there is the indication of the ransomware attack in a case of identifying that the file is included in the plurality of files to be protected by the protection application and when the initial accessing of the file is not performed by any of the plurality of trusted users;
allocating, by the processing system, a designated storage location, wherein the designated storage location is accessible only by the protection application so that no unauthorized code or device can access files stored in the designated storage location;
storing, by the processing system and in response to the indication of the ransomware attack, the reference copy of the file in the designated storage location for recovery of the reference copy by the protection application after any unauthorized manipulation or alteration of the file;
further detecting, by the processing system and based on the detecting of the initial accessing of the file, that the file is no longer being accessed;
applying, by the processing system, a checksum operation to the file to generate a checksum in response to the further detecting that the file is no longer being accessed;
determining, by the processing system, that the checksum does not match an expected checksum for the file and thereby that the indication of the ransomware attack comprises an actual ransomware attack;
generating, by the processing system, an alert the actual ransomware attack in response to the determining that the checksum does not match the expected checksum, wherein the generating the reference copy of the file enables protection against the ransomware attack; and
thwarting the actual ransomware attack by retrieving the reference copy of the file from the designated storage location, resulting in a retrieved reference copy, and by overwriting the file with the retrieved reference copy.

2. The method of claim 1, wherein the alert indicates an encryption of the file by a ransomware process, wherein the protection application further functions as an independent operating system on a protected computing system that comprises the at least one drive or drive partition, wherein the protection application is configured to interface with one or more hardware components of the protected computing system and is active upon rebooting of the protected computing system to prevent the protected computing system from being rebooted and the at least one drive or drive partition from being locked by encryptor-type ransomware, and wherein, if the initial accessing of the file comprises a read of less than an entirety of the file, the generating the reference copy of the file comprises generating a copy of only a read portion of the file and not a remainder of the file.

3. The method of claim 1, further comprising:
applying a bit-level or a byte-level comparison of the file and the reference copy of the file to generate a correlation metric between the file and the reference copy of the file, wherein the applying the bit-level or byte-level comparison is performed in response to the determining that the checksum does not match the expected checksum.

4. The method of claim 3, further comprising:
further determining that the actual ransomware attack comprises an encryption of the file by a ransomware process, when the correlation metric is less than a threshold level of correlation, wherein the alert indicates the encryption of the file by the ransomware process.

5. The method of claim 3, further comprising:
further determining that a manipulation of the file comprises a modification of the file by an application, a process, or a user that exceeds a permission level of the application, the process, or the user, when the correlation metric is greater than a threshold level of correlation.

6. The method of claim 1, wherein at least the detecting, the further detecting, and the generating the reference copy of the file are performed by the processing system using a kernel level component that interfaces between running processes and a file system containing the file.

7. The method of claim 1, wherein the alert presents a plurality of response options to address the actual ransomware attack, the method further comprising:
obtaining a selection of one of the plurality of response options; and
implementing the one of the plurality of response options.

8. The method of claim 7, wherein one of the plurality of response options comprises the overwriting.

9. The method of claim 1, wherein the generating the reference copy of the file in response to the file the determination, the storing the reference copy of the file in the designated storage location, the further detecting that the file is no longer being accessed, and the applying the checksum operation to generate the checksum comprise a verification process to detect a manipulation of the file, and wherein the method further comprises:
detecting an additional accessing of the file by a trusted application, a trusted process, or a trusted user, wherein the processing system omits performance of the verification process for the additional accessing of the file by the trusted application, the trusted process, or the trusted user.

10. The method of claim 1, further comprising:
further applying, by the processing system, the checksum operation to the reference copy of the file to generate the expected checksum.

11. The method of claim 1, wherein the initial accessing of the file is from a protected computing system.

12. The method of claim 11, wherein the processing system comprises at least a portion of the protected computing system, and wherein the protected computing system comprises:
a single computing device; or
a plurality of computing devices.

13. The method of claim 11, wherein the protected computing system comprises a virtual machine that is hosted by one or more host computing devices.

14. The method of claim 11, wherein the protected computing system comprises a distributed data storage system comprising a plurality of host storage devices.

15. The method of claim 11, wherein the designated storage location is selected by an administrator of the protected computing system, and wherein the designated storage location comprises at least one of:
a data storage component of the protected computing system; or
an external data storage device.

16. The method of claim 11, wherein the designated storage location comprises a distributed data storage system provided via a plurality of host data storage devices.

17. A non-transitory computer-readable medium storing instructions which, when executed by a processing system including at least one processor, cause the processing system to perform operations including implementing a protection application, the operations comprising:
presenting a user interface that enables user selection of files, drives, and drive partitions to be protected by the protection application and enables users election of trusted users permitted to modify protected files;
receiving, via the user interface, a first user designation of a plurality of files and at least one drive or drive partition to be protected by the protection application and a second user designation of a plurality of trusted users;
detecting a read operation of a file during an initial accessing of the file;
responsive to the detecting the read operation of the file, determining whether there is an indication of a ransomware attack by identifying whether the file is included in the plurality of files to be protected by the protection application and whether the initial accessing of the file is performed by any of the plurality of trusted users;
generating a reference copy of the file in response to a determination that there is the indication of the ransomware attack based on identifying that the file is included in the plurality of files to be protected by the protection application and when the initial accessing of the file is not performed by any of the plurality of trusted users;
allocating a designated storage location, wherein the designated storage location is accessible only by the protection application so that no unauthorized code or device can access files stored in the designated storage location;
storing, in response to the indication of the ransomware attack, the reference copy of the file in the designated storage location for recovery of the reference copy by the protection application after an unauthorized manipulation or alteration of the file;
further detecting the file is no longer being accessed;
applying a checksum operation to the file to generate a checksum in response to further detecting completion of the accessing of the file;
determining that the checksum does not match an expected checksum for the file and thereby that the indication of the ransomware attack comprises an actual ransomware attack;
generating an alert of the actual ransomware attack in response to the determining that the checksum does not match the expected checksum, wherein the generating the reference copy of the file enables protection against the ransomware attack; and
thwarting the actual ransomware attack by retrieving the reference copy of the file from the designated storage location, resulting in a retrieved reference copy, and by overwriting the file with the retrieved reference copy.

18. An apparatus comprising:
a processing system including at least one processor; and
a computer-readable medium storing instructions which, when executed by the processing system, cause the processing system to perform operations including implementing a protection application, the operations comprising:
presenting a user interface that enables user selection of files, drives, and drive partitions to be protected by the protection application and enables users election of trusted users permitted to modify protected files;
receiving, via the user interface, a first user designation of a plurality of files and at least one drive or drive partition to be protected by the protection application and a second user designation of a plurality of trusted users;
detecting a read operation of a file during an initial accessing of the file;

responsive to the detecting the read operation of the file, determining whether there is an indication of a ransomware attack by identifying whether the file is included in the plurality of files to be protected by the protection application and whether the initial accessing of the file is performed by any of the plurality of trusted users;

generating a reference copy of the file in response to a determination that there is the indication of the ransomware attack based on identifying that the file is included in the plurality of files to be protected by the protection application and when the initial accessing of the file is not performed by any of the plurality of trusted users;

allocating a designated storage location, wherein the designated storage location is accessible only by the protection application so that no unauthorized code or device can access files stored in the designated storage location;

storing, in response to the indication of the ransomware attack, the reference copy of the file in the designated storage location for recovery of the reference copy by the protection application after an unauthorized manipulation or alteration of the file;

further detecting the file is no longer being accessed;

applying a checksum operation to the file to generate a checksum in response to further detecting completion of the accessing of the file;

determining that the checksum does not match an expected checksum for the file and thereby that the indication of the ransomware attack comprises an actual ransomware attack;

generating an alert of the actual ransomware attack in response to the determining that the checksum does not match the expected checksum, wherein the generating the reference copy of the file enables protection against the ransomware attack; and thwarting the actual ransomware attack by retrieving the reference copy of the file from the designated storage location, resulting in a retrieved reference copy, and by overwriting the file with the retrieved reference copy.

19. The apparatus of claim 18, wherein the protection application functions as an independent operating system on a protected computing system that comprises the at least one drive or drive partition, wherein the protection application is configured to interface with one or more hardware components of the protected computing system and is active upon rebooting of the protected computing system to prevent the protected computing system from being rebooted and the at least one drive or drive partition from being locked by encryptor-type ransomware, and wherein, if the initial accessing of the file comprises a read of less than an entirety of the file, the generating the reference copy of the file comprises generating a copy of only a read portion of the file and not a remainder of the file.

20. The non-transitory computer-readable medium of claim 17, wherein the protection application functions as an independent operating system on a protected computing system that comprises the at least one drive or drive partition, wherein the protection application is configured to interface with one or more hardware components of the protected computing system and is active upon rebooting of the protected computing system to prevent the protected computing system from being rebooted and the at least one drive or drive partition from being locked by encryptor-type ransomware, and wherein, if the initial accessing of the file comprises a read of less than an entirety of the file, the generating the reference copy of the file comprises generating a copy of only a read portion of the file and not a remainder of the file.

* * * * *

UNITED STATES PATENT AND TRADEMARK OFFICE
CERTIFICATE OF CORRECTION

| | | |
|---|---|---|
| PATENT NO. | : 11,409,868 B2 | Page 1 of 1 |
| APPLICATION NO. | : 16/584284 | |
| DATED | : August 9, 2022 | |
| INVENTOR(S) | : Dylan Reid et al. | |

It is certified that error appears in the above-identified patent and that said Letters Patent is hereby corrected as shown below:

In the Claims

Claim 1, Column 17, Line 45, please delete "enables a user selection" and insert -- enables user selection --

Claim 9, Column 19, Lines 18 and 19, please delete "in response to the file the determination" and insert -- in response to the determination --

Claim 17, Column 19, Line 66, please delete "enables users election of" and insert -- enables user selection of --

Claim 18, Column 20, Line 59, please delete "enables users election of" and insert -- enables user selection of --

Signed and Sealed this
Twentieth Day of September, 2022

*Katherine Kelly Vidal*

Katherine Kelly Vidal
*Director of the United States Patent and Trademark Office*